United States Patent [19]

Dishner

[11] Patent Number: 4,743,812
[45] Date of Patent: May 10, 1988

[54] BOOST/BUCK DC/DC CONVERTER

[75] Inventor: Bryan W. Dishner, Roscoe, Ill.

[73] Assignee: Sundstrand Corporation, Rockford, Ill.

[21] Appl. No.: 946,086

[22] Filed: Dec. 23, 1986

[51] Int. Cl.$^4$ ............................................. H02P 9/00
[52] U.S. Cl. ...................................... 318/14; 322/40; 290/4 C; 290/4 R
[58] Field of Search ................... 318/9, 10, 11, 12, 13, 318/14, 49, 50, 111; 290/4 C, 4 R; 322/40; 323/224, 222, 271; 363/16

[56] References Cited

U.S. PATENT DOCUMENTS

| 4,186,437 | 1/1980 | Cuk | 363/16 X |
|---|---|---|---|
| 4,245,286 | 1/1981 | Paulkovich et al. | 363/21 |
| 4,347,474 | 8/1982 | Brooks et al. | 323/222 X |
| 4,382,188 | 5/1983 | Cronin | 318/13 X |
| 4,395,675 | 7/1983 | Toumani | 323/271 |
| 4,572,961 | 2/1986 | Borger | 322/40 X |
| 4,578,630 | 3/1986 | Grosch | 323/271 |
| 4,661,762 | 4/1987 | Baker | 318/12 X |

OTHER PUBLICATIONS

J. J. Cathey, "Electrically Compensated Aircraft Alternator Drive", IEEE publication, 1983, No. 0547-3578/83/0000-0116.

Primary Examiner—Bentsu Ro
Attorney, Agent, or Firm—Wood, Dalton, Phillips, Mason & Rowe

[57] ABSTRACT

A bi-directional DC/DC converter includes a first switch coupled to a first input/output of the converter, a first input/output energy storage element coupled to the first input/output of the converter, a second input-/output energy storage element coupled to a second input/output of the converter, an intermediate energy storage element coupled between the second input/output and the first switch and a second switch coupled to the intermediate energy storage element and to the first switch. A pulse width modulator operates the first switch between on and off states while the second switch is maintained in an off state to operate the converter as a buck converter, during which time the power is transferrred from the first input/output to the second input/output. A further pulse width modulator operates the second switch between on and off states while the first switch is maintained in the off state to operate the converter as a boost converter, during which time power is transferred from the second input-/output to the first input/output.

12 Claims, 4 Drawing Sheets

BOOST/BUCK DC/DC CONVERTER

DESCRIPTION

1. Technical Field

The present invention relates generally to power converters, and more particularly to a DC/DC converter.

2. Background

Currently known DC/DC converters are of various types, including buck, boost or buck/boost types. The buck and boost types develop decreased and increased output voltages relative to an input voltage, respectively. The buck/boost converter can function as either a buck or a boost converter depending upon the duty cycle of one or more switches in the converter.

Most DC/DC converters utilize power switches which control the flow of power through a transformer primary winding. An induced voltage established in a transformer secondary winding is rectified and filtered to produce the DC output. Such types of converters are necessarily large and heavy due to the use of the transformer.

A further type of converter is disclosed in Paulkovich et al U.S. Pat. No. 4,245,286. This patent discloses a buck/boost regulator having a first switch which is coupled between an input of the regulator and an inductor and a transformer winding. A capacitor and load are coupled through diodes to the inductor and the transformer winding. A pulse width modulator senses the voltage across the load and controls the first switch as well as second and third switches which are coupled across the ends of the transformer winding to control the voltage delivered to the load.

The Paulkovich regulator, however, is relatively complex in that it requires a large number of components together with a transformer winding.

There may be times when it is necessary or desirable to transfer power bi-directionally through a DC/DC converter. For example, as disclosed in Dishner et al U.S. patent application Ser. No. 893,943, filed Aug. 6, 1986, entitled "Power Converter for an Electrically-Compensated Constant Speed Drive" and assigned to the assignee of the instant application, the disclosure of which is hereby incorporated by reference, there is disclosed an electrically-compensated constant speed drive which develops constant speed motive power from variable speed motive power provided by a prime mover. The drive includes first and second permanent magnet machines having electrical power windings which are interconnected by first and second AC/DC converters and a DC/DC converter. In this constant speed drive, one of the machines is operated as a generator while the other is operated as a motor so that the speed of an output shaft of the drive is maintained constant even with changes in speed of the prime mover. The DC/DC converter used in this constant speed drive is complex in nature since it must be capable of bi-directional operation, i.e. it must be capable of transferring power from one machine to the other and vice versa, and it must be capable of boosting or bucking the voltage in both directions of power flow. The converter includes steering switches which connect an input of the converter to one of the AC/DC converters and an output of the converter to the other of the AC/DC converters, an inverter for converting DC power developed by one of the AC/DC converters into intermediate AC power, a transformer for shifting the voltage of the intermediate AC power and a rectifier for rectifying the output of the transformer so that output DC voltage is developed. Bypass switches are also provided in the event it is desired to bypass the DC/DC converter.

While the DC/DC converter described in the above-referenced patent application performs satisfactorily for its intended purpose, it would be desirable to reduce the number of components used therein to in turn reduce the size and weight of the overall constant speed drive.

A greatly simplified DC/DC converter which is capable of boosting or bucking voltage for power flow in either of two directions is disclosed in Dishner U.S. patent application Ser. No. 946,444, filed Dec. 12, 1986, entitled "Bi-directional Buck/Boost DC/DC Converter" and assigned to the assignee of the instant application.

DISCLOSURE OF INVENTION

In accordance with the present invention, a DC/DC converter accomplishes bi-directional power flow yet is simple in design.

More specifically, the DC/DC converter includes a first switch coupled to a first input/output of the converter, a first input/output energy storage element coupled with the first input/output of the converter, a second input/output energy storage element coupled to a second input/output of the converter, an intermediate energy storage element coupled between the second input/output and the first switch and a second switch coupled to the intermediate energy storage element and to the first switch. Means are included for operating the first switch between on and off states while maintaining the second switch in the off state so that the converter operates as a simple buck converter during which time power is transferred from the first input/output to the second input/output. When it is desired to transfer power from the second input/output to the first input/output, the second switch is operated between on and off states while the first switch is maintained in the off state so that the converter operates as a simple boost converter.

The present invention finds particular utility in an electrically-compensated constant speed drive of the type disclosed in the above referenced Dishner et al patent application, although the converter may be useful in other applications as well. When used in this constant speed drive, the speed range of the prime mover is limited so that only voltage boosting is required for power flow in one direction and so that only voltage bucking is required for power flow in the opposite direction.

The converter of the present invention uses only a few electrical components and produces a substantially DC output voltage with minimum ripple current.

BRIEF DESCIPTION OF DRAWINGS

BEST FOR MODE FOR CARRYING OUT THE INVENTION

Figure 1:
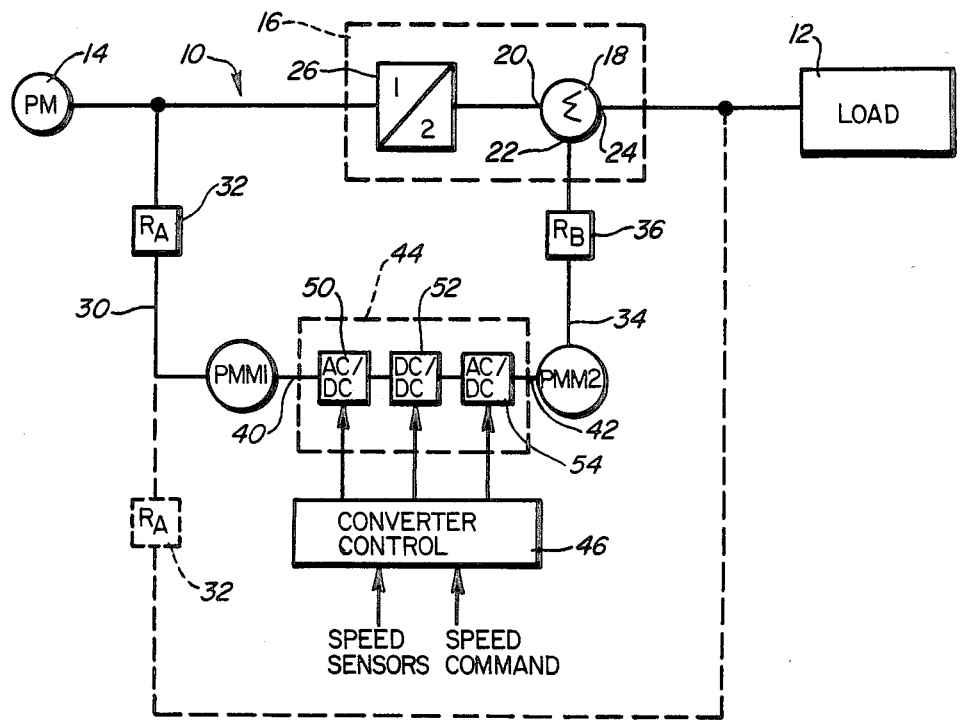
FIG. 1 is a block diagram of the electrically-compensated constant speed drive disclosed in the above-referenced Dishner et al application together with a DC/DC converter according to the present invention.

Referring now to FIG. 1, there is illustrated an electrically-compensated constant speed drive 10 as described and claimed in the above referenced Dishner et al patent application. The constant speed drive 10 develops constant speed motive power for driving a load 12, such as a generator, from variable speed motive power developed by a prime mover 14. The drive includes a mechanical differential 16 which includes a speed summer 18 having a first input 20, a second input 22 and an output 24. The first input 20 of the speed summer is coupled to the output of the prime mover 14 via a block 26 which represents a 2:1 speed increase. This speed increase is an inherent operational characteristic of the differential 16. The output 24 of the speed summer 18 is coupled to the load 12.

A first permanent magnet machine PMM1 includes a motive power shaft 30 which is coupled by a gear box 32 to the output shaft of the prime mover 14. Alternatively, as noted by the dashed lines of FIG. 1, the motive power shaft of the PMM1 may be coupled through the gear box 32 to the output shaft 24 of the speed summer 18.

A second permanent magnet machine PMM2 includes a motive power shaft 34 which is coupled by a gear box 36 to the second input 22 of the speed summer 18.

The permanent magnet machines PMM1 and PMM2 include electrical power windings which are interconnected by conductors 40,42 and a power converter 44 which manages the flow of power between the machines PMM1 and PMM2. The power converter 44 is controlled by a converter control circuit 46 which receives a signal representing the desired speed of the output shaft 24 of the speed summer 18 and signals representing the actual speed of the output 24 and/or the output speed of the prime mover 14.

The constant speed drive is designed to operate above and below a prime mover speed condition known as "straight-through" which occurs when the output speed of the prime mover is equal to one-half the desired output speed of the differential 16. At the straight-through condition, the speed of the input 20 of the speed summer 18 is equal to the speed of the output 24, and hence the speed of the second input 22 is zero.

When the prime mover speed is below straight-through, the permanent magnet machine PMM2 must be operated as a motor to develop compensating speed of a direction and magnitude which augments the speed at the first input of the speed summer 18 so that the desired speed at the output 24 is maintained. Under these conditions, the machine PMM1 is operated as a generator to produce alternating current power on the conductors 40 which is delivered to a first bi-directional AC/DC converter 50 in the power converter 44. The AC/DC converter 50 converts the alternating current power into DC power and delivers same to a DC/DC converter 52. The DC/DC converter 52 is in turn coupled to a second bi-directional AC/DC converter 54. When the prime mover speed is below straight-through, the AC/DC converter 54 operates as a motor inverter to energize the windings of the PMM2.

As noted in greater detail hereinafter, unless the speed of the prime mover is limited to a particular range, the AC/DC converter 50 may develop a voltage which is greater than, equal to or less than the voltage required by the AC/DC converter 54 to operate the PMM2 at the required compensating speed. Therefore, the DC/DC converter 52 must be capable of boosting or bucking the voltage developed at the output of the AC/DC converter 50 before it is applied to the AC/DC converter 54.

When the prime mover speed is above straight-through, the machine PMM2 is operated as a generator while the PPM1 is operated as a motor. In this case, the power flow through the power converter 44 is reversed as compared to the situation where the prime mover speed is below straight-through. Unless the prime mover speed is limited in this range, the DC/DC converter 52 must be capable of boosting and bucking the voltage developed by the AC/DC converter 54 before it is applied to the AC/DC converter 50.

On the other hand, if the prime mover output speed is limted to a particular range, the DC/DC converter 52 need only be capable of voltage boosting when power flow is in one direction and voltage bucking when power flow is in the opposite direction.

Figure 2:
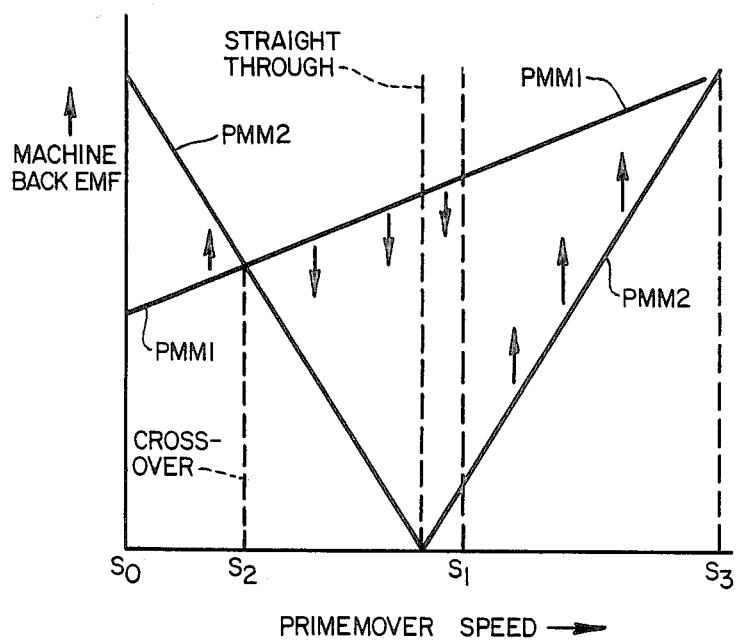
FIG. 2 is a graph illustrating the back electromotive force developed by each of the permanent magnet machines PMM1 and PMM2 shown in FIG. 1 over a range of prime mover speeds.

As seen in FIG. 2 which illustrates machine back emf versus prime mover speed, it can be seen that the back emf of the machine PMM2 starts at a high value at the low end of the prime mover speed range, drops to zero at the straight-through speed and increases with increasing prime mover speeds above straight-through. Intuitively, this should be self-evident since the permanent magnet machine PMM2 develops no compensating speed at straight-through and develops maximum compensating speed at the extremes of the speed range.

The graph of FIG. 2 also shows that the permanent magnet machine PMM1 exhibits a linearly increasing machine back emf curve from the low end of the speed range to the high end.

As illustrated by the arrows of FIG. 2, it is necessary to transfer power from the PMM1 to the PMM2 for prime mover speeds between the low end $S_0$ of the prime mover speed range up to a prime mover speed $S_1$ which is slightly greater than the straight-through speed. In a speed range between $S_0$ and a speed $S_2$ at which the back emf curve for the machine PMM1 equals the back emf curve for the machine PMM2, the machine PMM1 develops a voltage less than that required by the AC/DC converter 54 to operate the PMM2 at the required speed. Accordingly, between the speed $S_0$ and the speed $S_2$ (referred to as the "cross-over speed"), the DC/DC converter 52 must act as a boost converter to provide the proper voltage to the AC/DC converter 54.

Between the speed $S_2$ and the speed $S_1$, the machine PMM1 develops an output voltage greater than that required by the AC/DC converter 54, and hence the DC/DC converter 52 must operate as a buck converter in this range.

Between the speed $S_1$ and the selected upper limit $S_3$ of the prime mover, power flows from the PMM2 to the PMM1. In this speed range, the voltage developed by the PMM2 is less than the voltage required by the AC/DC converter 50 to operate the PMM1 as a motor at the necessary speed, and hence the DC/DC converter 52 must operate as a boost converter.

It should be noted that if the speed $S_3$ is selected to be greater than that illustrated in FIG. 2, the DC/DC converter 52 would be required to operate as a buck converter for power flow from PMM2 to PMM1 owing to the crossing of the back emf curves for the machines. However, the prime mover speed range is normally constrained so that the speed $S_3$ is less than the speed at which the back emf curves cross one another.

Figure 3:
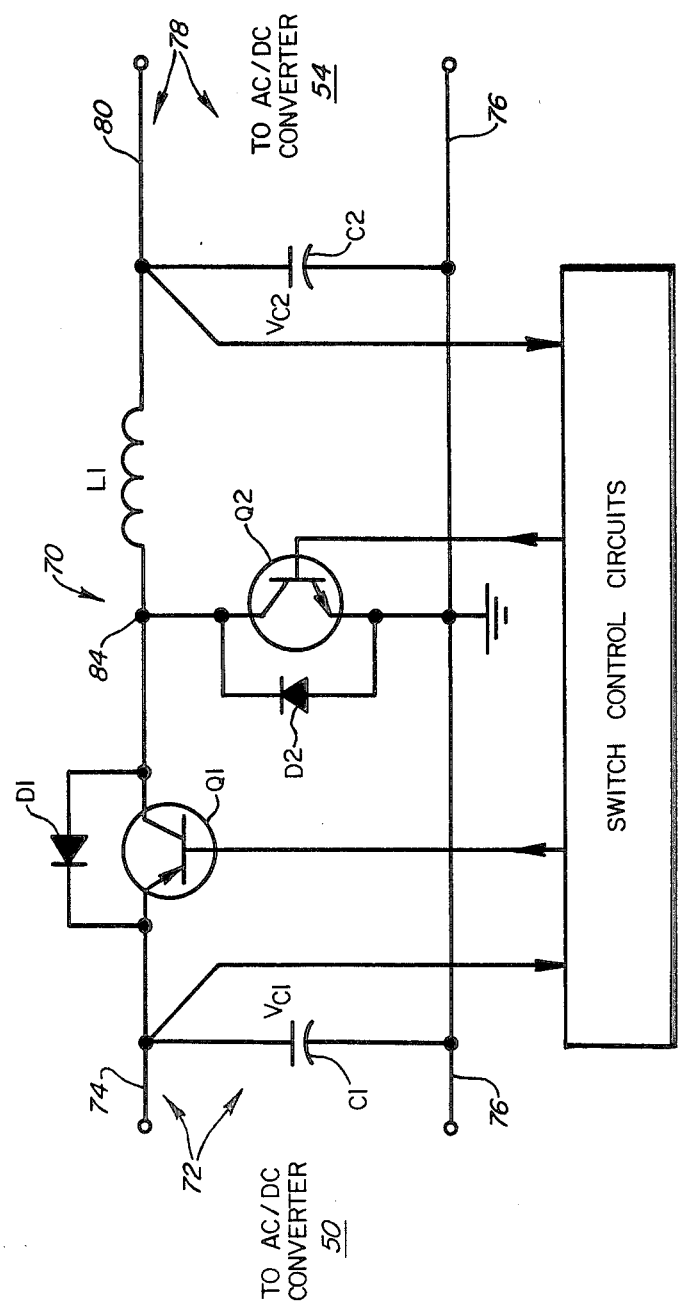
FIG. 3 is a schematic diagram of the DC/DC converter of the present invention.

It can be seen that if the speed range is constrained so that it lies between the speeds $S_2$ and $S_3$, then the DC/DC converter 52 may be replaced by a DC/DC converter 70 as seen in FIG. 3 which need only buck voltage when the prime mover speed is below the speed $S_1$ and need only boost voltage when the prime mover speed is above the speed $S_1$. In the event the speed range includes the speeds $S_2$ and/or $S_3$, the converter 70 must be capable of unity gain operation in one or both directions of power flow. As used herein, the terms "boost converter" and "buck converter" include unity gain operation.

The speed range limiting can be accomplished by adjusting the speed ratios of $R_a, R_b$ of the gear boxes 32,36, respectively, and/or by adding a further gear box between the output of the prime mover and the input of the differential 16, if necessary. The speeds of the shafts 30,34 of the machines PMM1 and PMM2 are thereby constrained so that the voltage developed by the PMM1 is equal to or greater than the voltage required by the AC/DC converter 54 when power is to be transferred from the machine PMM1 to the machine PMM2 and so that the voltage developed by the machine PMM2 is less than that required by the AC/DC converter 50 when power flow is from the PMM2 to the PMM1.

As seen in FIG. 3, the converter 70 acts as a simple buck converter when power is to be transferred from the AC/DC converter 50 to the AC/DC converter 54 and acts as a simple boost converter when power is to be transferred in the opposite direction. The converter includes a first input/output 72 coupled to a first conductor 74 and a second conductor 76. The second conductor 76 is coupled to a source of reference voltage, such as ground potential. The converter also includes a second input/output 78 which is connected to the second conductor 76 and a third conductor 80.

A first input/output energy storage element comprising a capacitor C1 is coupled to the first input/output 72 across the first and second conductors 74,76. A second input/output energy storage element comprising a capacitor C2 is coupled to the second input/output 78 across the second and third conductors 76,80.

A first switch, illustrated as a power transistor Q1, is coupled to the first input/output 72 by the first conductor 74. An intermediate energy storage element comprising an inductor L1 is coupled between the first switch Q1 and the third conductor 80. A second switch comprising a power transistor Q2 includes a first end coupled to the junction 84 between the first switch Q1 and the inductor L1 and further includes a second end coupled to the second conductor 76.

The first and second switches Q1,Q2 conduct current unidirectionally and, in the preferred embodiment, are of complementary conductivity type. As noted more specifically hereinafter, during operation of the converter 70 only one of the switches Q1 and Q2 is operated at any particular time while the other switch is held off.

A first diode D1 is coupled in anti-parallel relationship with the switch Q1. Likewise, a second diode D2 is coupled in anti-parallel relationship with respect to the transistor Q2. That is, the diodes D1 and D2 conduct currents in a direction opposite to the currents conducted by the switches Q1 and Q2, respectively, when such switch is on.

In operation of the converter shown in FIG. 3, when power flow is to occur from the first input/output 72 to the second input/output 78, the switch Q2 is opened or held off and the switch Q1 is alternately operated between on (closed) and off (opened) states. When the switch Q1 is turned on, a voltage $V_{C1}$ across the capacitor C1 is applied between the junction 84 and ground potential. This voltage causes the current through the inductor L1 to increase in a substantially linear fashion. When the transistor Q1 is subsequently turned off or opened, the current that was supplied by the switch Q1 through the inductor L1 is instead supplied through the diode D2. The conduction of the diode D2 causes the voltage at the junction 84 to drop to substantially ground potential. As a result of this change in voltage, the current through the inductor L1 drops substantially linearly until the switch Q1 is again closed. During this operation of the converter, the capacitor C2 filters the output voltage so that a substantially DC level is produced at the second input/output 78.

The equation describing the relationship of output voltage $V_{C2}$ at the second input/output 78 across the capacitor C2 relative to the input voltage $V_{C1}$ at the first input/output 72 across the capacitor C1 is as follows:

$$V_{C2} = DC_1 \times V_{C1}$$

where $DC_1$ is the duty cycle of the switch Q1.

As illustrated by the foregoing equation, the converter 70 acts as a simple buck converter since the duty cycle $DC_1$ of the switch Q1 is always less than or equal to one.

When it is desired to transfer power from the second input/output 78 to the first input/output 72, the switch Q1 is held in the open state and the switch Q2 is alternately opened and closed. When the switch Q2 is closed, substantially ground potential is applied to the junction 84 and hence the voltage $V_{C2}$ across the capacitor C2 is applied across the inductor L1. The current through the inductor L1 then flows from the third conductor 80 to the junction 84 and the magnitude thereof increases in substantially linear fashion. When the transistor Q2 is subsequently turned off, the inductor current flows through the diode D1 to the first conductor 74. While current is flowing through the diode D1, the voltage at the junction 84 is one diode drop above the voltage $V_{C1}$. It is a characteristic of this converter that the voltage $V_{C1}$ is always greater than the voltage $V_{C2}$, and hence the polarity of the voltage across the inductor L1 reverses as compared with the case when the switch Q2 is closed. Hence, the magnitude of the current through the inductor L1 falls in a substantially linear fashion until the switch Q2 subsequently turns on again.

During this operation of the converter, the capacitor C1 filters the output voltage so that a substantially DC voltage is obtained.

The output voltage $V_{C1}$ at the input/output 72 is related to the input voltage $V_{C2}$ at the input/output 78 during this operational mode of the converter as follows:

$$V_{C1} = V_{C2} \times 1/(1 - DC_2)$$

where $DC_2$ is the duty cycle of the switch Q2. As a practical matter, $DC_2$ is always less than 1 and hence the converter operates as a simple boost converter when power flow is from the second input/output 78 to the first input/output 72. When $DC_2=0$, the converter 70 operates in the unity gain mode.

Figure 4:
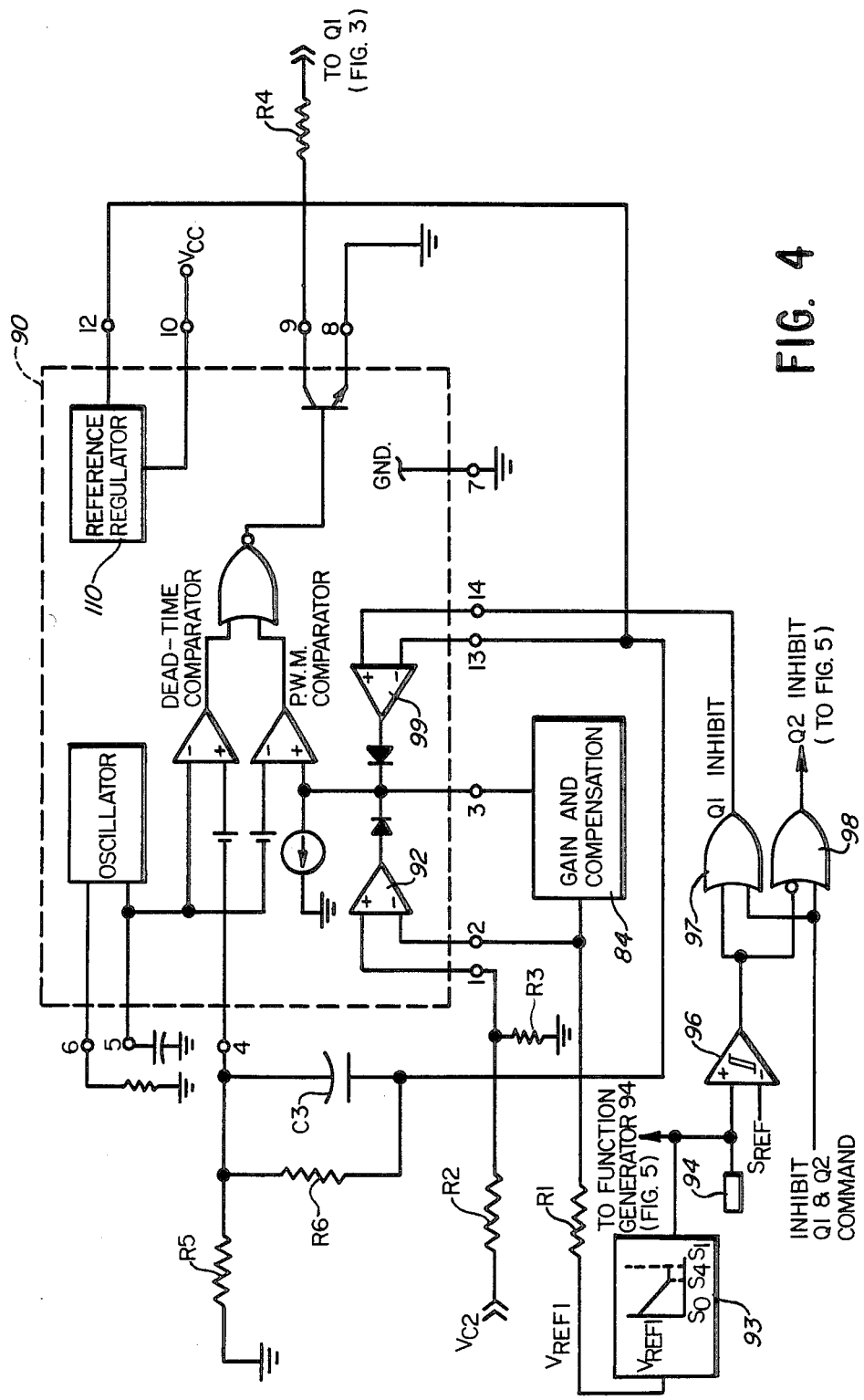
FIGS. 4 and 5 are combined schematic and block diagrams of control circuits for controlling the switches Q1 and Q2 shown in FIG. 3.

Referring now to FIG. 4, the switch Q1 is controlled by a pulse width modulator which is implemented in part by a Motorola MC35060 integrated circuit (IC) 90. External circuit components are connected to pins identified by numbers immediately outside of the representation of the integrated circuit 90. The voltage $V_{C2}$ across the capacitor C2 is coupled to a pin 1 of the IC 90. A reference signal $V_{REF1}$ representing the desired voltage across the capacitor C2 is coupled to a pin 2 through a resistor R1. The signals $V_{C2}$ and $V_{REF1}$ are subtracted by an error amplifier 92 of the IC 90 to develop an error signal representing the deviation of the output voltage from the signal $V_{REF1}$.

The reference signal $V_{REF1}$ is generated by a function generator 93 which is responsive to a speed signal developed by a speed sensor 94 representing prime mover speed. The function generator decreases the amplitude of the signal $V_{REF1}$ with increasing prime mover speed until a speed $S_4$ is reached. Beyond the speed $S_4$ the signal $V_{REF1}$ is held constant until the speed $S_1$ is attained. Above the speed $S_1$, the level of the signal $V_{REF1}$ is immaterial and may be maintained at a zero level.

The reference signal $V_{REF1}$ controls the inpout voltage to the converter 52 so that the PMM2 is operated as a motor of the required speed when the prime mover speed is below the speed $S_1$.

A gain and compensation circuit 84 is coupled between the pins 2 and 3 and a resistor R3 is coupled between the pin 1 and ground potential so that the converter 70 operates in the desired fashion.

The integrated circuit 90 develops a pulse width modulated (PWM) waveform at a pin 9 having a duty cycle determined in accordance with the magnitude of the error signal developed by the error amplifier 92. The PWM waveform is coupled through a resistor to the base of the transistor Q1. If necessary or desirable, the output appearing at the pin 9 may be amplified before it is applied to the base of the transistor Q1.

A soft-start function may be implemented by connecting resistors R5 and R6 and a capacitor C3 to pin numbers 4, 13 and 12 of the IC 90.

The control illustrated in FIG. 4 includes circuitry for inhibiting operation of one or both of the transistors Q1 and Q2. Below the speed $S_1$ shown in FIG. 2, the transistor Q2 is held off while at speeds above $S_1$ the transistor Q1 is held off. This is accomplished by means of a level comparator 96 which compares the speed signal developed by the speed sensor 94 against a reference signal $S_{REF}$ representing the speed $S_1$. The output of the level comparator 96 is coupled to a first noninverting input of an OR gate 97 and to an inverting input of an OR gate 98. Second noninverting inputs of the OR gates 97,98 receive an inhibit command signal which may be developed, for example, by a comparator (not shown) which develops a high state signal when the prime mover speed is below the speed $S_0$ or above the speed $S_3$. Also, the inhibit command signal may be in a high state when a fault arises in the circuitry for controlling the switches Q1,Q2 or in another part of the converter or constant speed drive.

The OR gates 97,98 develop Q1 and Q2 inhibit signals, respectively. The Q1 inhibit signal is coupled to a pin 14 of the IC 90. The level of the signal at the pin 14 is compared with a reference signal at a pin 13 by an internal comparator 99 of the IC 90. When the Q1 inhibit signal is generated, current flow into the pin 9 is terminated so that the transistor Q1 is turned off.

Figure 5:
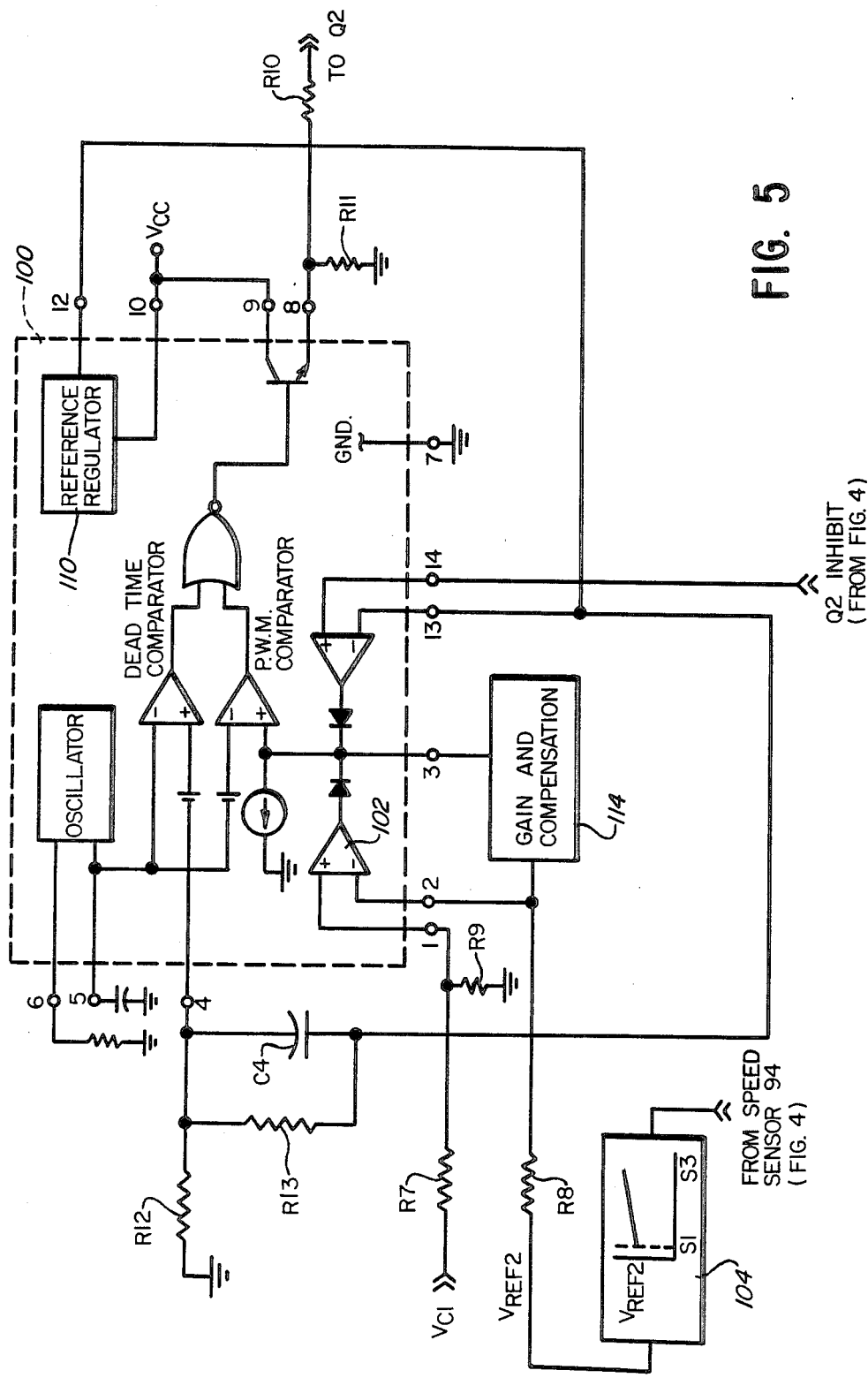

The Q2 inhibit signal developed by the OR gate 98 is coupled to control circuitry for the transistor Q2 illustrated in FIG. 5. The control utilizes an integrated circuit 100 which is identical to the IC 90 described in connection with FIG. 4. The voltage $V_{C1}$ is coupled through a resistor R7 to the pin 1 of the IC 100. A signal $V_{REF2}$ is coupled through a resistor R8 to the pin 2. The signal $V_{C1}$ is subtracted from the signal $V_{REF2}$ by an internal error amplifier 102 to develop an error signal.

The signal $V_{REF2}$ is developed by a second function generator 104 which is responsive to the speed signal developed by the speed sensor 94. The function generator 104 increases the magnitude of $V_{REF2}$ with increasing prime mover speed up to the speed $S_3$. Below the speed $S_1$ and above the speed $S_3$, the level of the signal $V_{REF2}$ is immaterial and may be maintained at a zero level.

The reference signal $V_{REF2}$ controls the input voltage to the converter 50 so that the PMM1 is operated as a motor at the speed determined by the prime mover and gear box 32 at prime mover speeds above $S_1$.

A gain and compensation circuit 114 is coupled between the pins 2 and 3 and a resistor R9 is coupled between the pin 1 and ground so that the converter 70 operates in the desired fashion.

The integrated circuit 100 develops a pulse width modulated (PWM) waveform at a pin 8 in response to the error signal developed by the error amplifier 102. The PWM waveform is coupled through a resistor R10 to the base of the transistor Q2. Again, the signal developed at the pin 8 may be amplified before it is applied to the transistor Q2.

A resistor R11 is coupled between the pin 8 and ground potential so that the PWM waveform is maintained at an appropriate level. As distinguished from the circuit illustrated in FIG. 4, the pin 9 of IC 100 is coupled to a voltage $V_{CC}$.

Again, a soft-start function may be implemented by resistors R12,R13 and a capacitor C4 which are coupled between the pins 4, 13 and 12.

The Q2 inhibit signal developed by the OR gate 98 is coupled to the pin 14 while a reference signal is coupled to the pin 13. When the Q2 inhibit signal is in the high state, the output appearing at the pin 8 is near or at a zero level so that the transistor Q2 is held off.

In each of the control circuits illustrated in FIGS. 4 and 5, the reference signal coupled to the pin 13 is developed by an internal reference regulator 110 of the IC 90 or 100. It should be noted that the reference signals coupled to the pins 13 of the IC's 90 and 100 may instead be developed by different circuits, if desired.

It should also be noted that the level comparator 96 is designed to include hysteresis to prevent dithering of the controls when the prime mover speed is in the vicinity of the speed $S_1$. Also, $V_{REF1}$ and $V_{REF2}$ may alternatively be made constant over the prime mover speed range, in which case the converters 50,54 would need to control the voltage applied to the machines PMM1 and PMM2. Other system variables, such as output power, could also be used to determine $V_{REF1}$ and $V_{REF2}$ in order to optimize system performance.

I claim:

1. An electrically-compensated constant speed drive for developing constant speed motive power from variable speed motive power developed by a prime mover, comprising:
   a differential speed summer having first and second input shafts and an output shaft which develops the constant speed motive power, the first input shaft being coupled to the prime mover;
   first and second permanent magnet machines each having a motive power shaft and electrical power windings wherein the motive power shaft of the first permanent magnet machine is coupled to either one of the first input shaft and the output shaft of the differential speed summer and wherein the motive power shaft of the second permanent magnet machine is coupled to the second input shaft of the differential speed summer; and
   a power converter interconnecting the electrical power windings of the first and second permanent magnet machines for controlling the flow of power between such windings, the power converter including a bi-directional DC/DC converter which acts only as a boost converter when power flow is from one permanent magnet machine to the other machine and which acts as a buck converter when power flow is from the other machine to the one machine.

2. The electrically-compensated constant speed drive of claim 1, wherein the power converter further includes a first bi-directional AC/DC converter coupled between the power windings of the first permanent magnet machine and the DC/DC converter and a second bi-directional AC/DC converter coupled between the electrical power windings of the second permanent magnet machine and the DC/DC converter.

3. The electrically-compensated constant speed drive of claim 1, wherein the DC/DC converter includes first and second switches wherein power flow occurs in one direction when the first switch is alternately operated between opened and closed states while the second switch is opened and wherein power flow occurs in the other direction when the second switch is alternatively operated between the opened and closed states while the first switch is opened.

4. The electrically-compensated constant speed drive of claim 3, wherein the DC/DC converter includes a first input/output coupled to the power windings of the first permanent magnet machine wherein the first switch is coupled to the first input/output, a second input/output coupled to the electrical power windings of the second permanent magnet machine, and an energy storage element coupled between the first switch and the second input/output wherein the second switch is coupled to the junction between the first switch and the energy storage element.

5. The electrically-compensated constant speed drive of claim 4, further including a capacitor coupled to each input/output.

6. The electrically-compensated constant speed drive of claim 4, wherein the energy storage element comprises an inductor.

7. The DC/DC converter of claim 3, wherein the first and second switches conduct current unidirectionally and further including first and second diodes coupled across and associated with the first and second switches, respectively, each diode being poled to conduct current in a direction opposite to the conduction direction of the associated switch.

8. The electronically compensated constant speed drive of claim 3, wherein the power converter further includes first and second pulse width modulators for operating the first and second switches, respectively.

9. An electrically-compensated constant speed drive for developing constant speed motive power from variable speed motive power developed by a prime mover, comprising:
   a differential speed summer having first and second input shafts and an output shaft which develops the constant speed motive power, the first input shaft being coupled to the prime mover;
   first and second permanent magnet machines each having a motive power shaft and electrical power windings wherein the motive power shaft of the first permanent magnet machine is coupled to either one of the first input shaft and the output shaft of the differential speed summer and wherein the motive power shaft of the second permanent magnet machine is coupled to the second input shaft of the differential speed summer;
   a power converter interconnecting the electrical power windings of the first and second permanent magnet machines for controlling the flow of power between such windings, the power converter including a bi-directional DC/DC converter which boosts voltage when power flow is from one permanent magnet machine to the other machine and which bucks voltage when power flow is from the other machine to the one machine, the DC/DC converter including
     a first input/output coupled to first and second conductors,
     a second input/output coupled to the second conductor and a third conductor, the second conductor being coupled to a source of reference voltage,
     a first energy storage element coupled across the first and second conductors,
     a first switch coupled to the first conductor,
     a second switch coupled between the first switch and the second conductor,
     a second energy storage element coupled between the first switch and the third conductor,
     a third energy storage element coupled across the second and third conductors,
     means for maintaining one of the switches open while the other switch is alternatively opened and closed wherein the first switch, when closed, conducts current from the first conductor to the third conductor through the second energy storage element and wherein the second switch, when closed, conducts current from the third conductor to the second conductor through the second energy storage element, and
     first and second diodes coupled across the first and second switches, respectively, in anti-parallel relationship therewith.

10. The electrically-compensated constant speed drive of claim 9, wherein the maintaining means includes first and second pulse width modulators coupled to and controlling the first and second switches, respectively, the pulse width modulators being interlocked so that the second switch is held open when the first switch is being controlled by the first pulse width modulator so that power flow occurs from the first input/output to the second input/output and the first switch is held open when the second switch is being controlled by the second pulse width modulator so that power flow occurs from the second input/output to the first input/output.

11. The electrically-compensated constant speed drive of claim 9, wherein the first and third energy storage elements comprise capacitors.

12. The electrically-compensated constant speed drive of claim 9, wherein the second storage element comprises an inductor.

* * * * *